March 16, 1926.
E. T. MALLOY
CASTER
Filed March 18, 1922
1,576,922
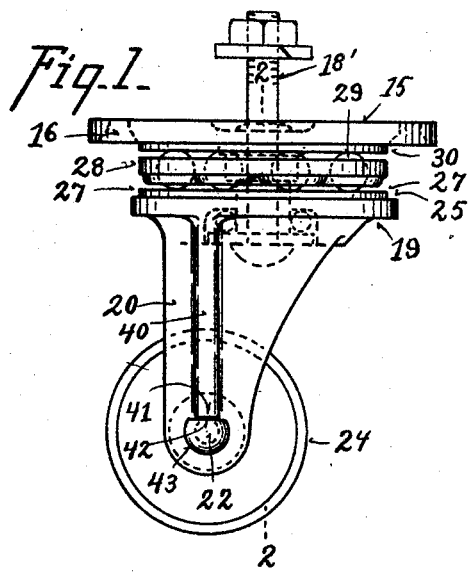
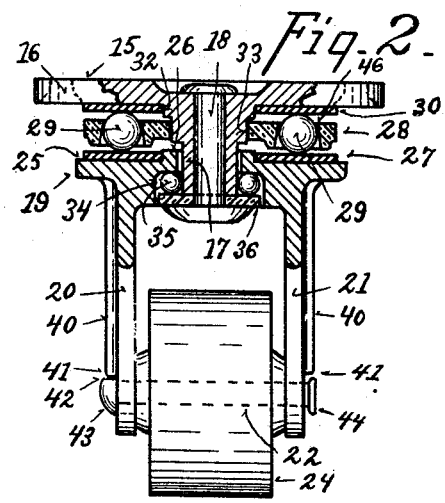
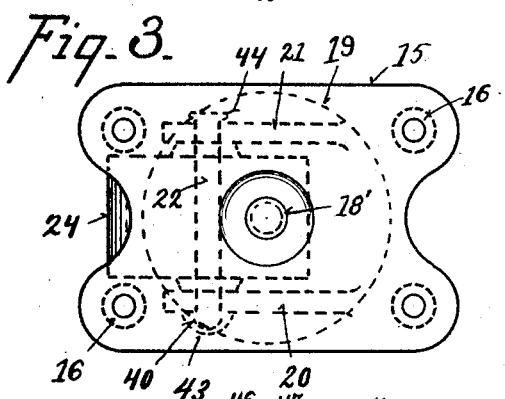
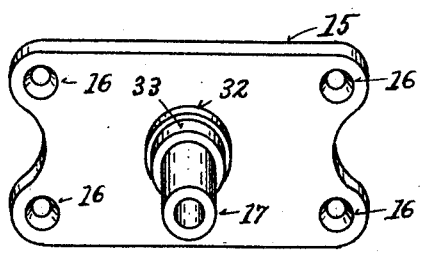
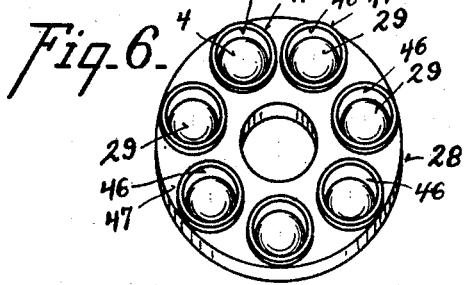
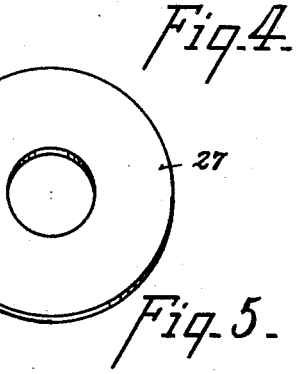
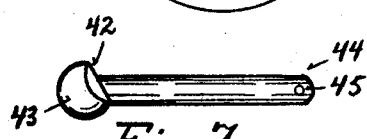
Inventor
Edward T. Malloy,
By C. W. Miles,
Attorney Patented Mar. 16, 1926.

1,576,922

UNITED STATES PATENT OFFICE.

EDWARD T. MALLOY, OF HAMILTON, OHIO.

CASTER.

Application filed March 18, 1922. Serial No. 544,910.

*To all whom it may concern:*

Be it known that I, EDWARD T. MALLOY, a citizen of the United States, residing at Hamilton, in the county of Butler and State of Ohio, have invented certain new and useful Improvements in Casters, of which the following is a specification.

My invention relates to improvements in casters. One of its objects is to provide a caster having an improved step or thrust bearing. Another object is to provide an improved ball cage, another object is to provide improved bearing plates or faces for the balls to travel on. Another object is to provide improved means to prevent the roller axle from rotating relative to the caster frame. Another object is to provide an improved caster assembly. My invention also comprises certain details of form, combination and arrangement all of which will be fully set forth in the description of the accompanying drawings in which:

Fig. 1, is a side elevation of a caster embodying my improvements.

Fig. 2, is a vertical section through the same on line 2—2 of Fig. 1.

Fig. 3, is a plan view of the caster shown in Fig. 1.

Fig. 4, is a perspective view of the caster plate detached.

Fig. 5 is a perspective view of one of ball plates.

Fig. 6 is a perspective view of the ball cage or spacer detached.

Fig. 7, is a perspective view of the caster wheel axle detached.

The accompanying drawings illustrate the preferred embodiment of my invention in which 15 represents the caster plate provided with screw holes 16, or other means by which said caster plate may be rigidly attached to an object to be supported upon casters. The caster plate is preferably provided with a tubular projection 17 through which a king-bolt cap screw or rivet 18 is inserted and secured in place relative thereto.

A caster housing or frame 19 is provided with two downwardly projecting arms 20 and 21 which serve as supports for opposite ends of the caster wheel axle 22. The caster wheel 24 is journaled upon the caster wheel axle 22, which axle is designed not to rotate relative to the arms 20 and 21 of the caster frame. The upper face 25 of the caster frame is plane, or if preferred may be provided with a short tubular upward projection 26. Mounted loosely upon the upper face 25 of the caster frame and retained centrally thereon by the projection 26, or in the absence of projection 26 by the projection 17 is a relatively thin hardened plate 27 preferably a hardened sheet iron or steel plate or washer as shown in Fig. 5. Mounted loosely upon the plate 27 is a ball cage or ball spacer 28 carrying a plurality of steel balls 29. A hardened iron or steel plate or washer 30 is mounted loosely upon and above the balls 29 and spacer 28 and the caster plate 15 is mounted loosely upon the steel plate 30. The tubular projection 17 of the caster plate 15 projects downwardly through the plate 30, spacer 28, plate 27, and through a vertical recess 31 in the caster frame 19 so as to retain the plate 30 in a central position with reference to the caster plate 15 upon the annular base section 32 of the projection 17 and so as to retain the ball cage 28 in a substantially central position with reference to the caster frame 15 through engagement with the annular section 33 of the tubular projection 17. A ball raceway 34 is formed in the caster frame 19 and provided with a series of balls 35 which are retained in place by a sheet metal washer or plate 36 held in place rigidly upon the outer end of the tubular projection 17 by means of the rivet 18, or if desired by means of a king-bolt or cap screw 18' in place of said rivet.

It is designed to employ unfinished castings for the plate 15 and frame 19, except that said castings are bored to receive the axle 22 and rivet 18. The hardened steel plates 27 and 30 are relatively thin but present smooth hard plane faces to the balls and resist the formation of grooves or dents in the faces thereof under normal strains. The plates 27 and 30 are placed against the unfinished faces of the plate 15 and frame 19 in order to secure harder and smoother faces than would be afforded by the unfinished castings, and also to afford a more extensive wearing face opposite the balls 29. This increased wearing face is attained through the plates 27 and 30 being free to move relative to the plate 15 and frame 19 so as to successively but slowly change their relative positions so as to successively present different fractions of the faces of the plates 27 and 30 at the points where the balls 29 bear most heavily upon the faces of said plates 27 and 30, and thereby prevent the formation of local grooves or depressions in the plates 27 and 30, and insure a much more extended wearing surface and a more uniform strain and wear thereon. The balls 35 assist the balls 29 in supporting the plate 15 and frame 19 in the desired relative position and to resist lateral strain tending to displace them due to the caster wheel axle being located at one side of the axis of the king-rivet 18. The balls 29 and 35 coact to insure a practically frictionless movement of the caster frame 19 relative to the plate 15 irrespective of heavy weights supported upon the plates 15 and the strain laterally due to the caster wheel axle being off-set relative to the king-rivet 18. The normal tendency of the off-set position of the caster wheel axle relative to the king-rivet is to place an excessive strain upon a portion only of the balls and a fraction of the bearing surfaces engaged by the balls, and hence to make local depressions in the bearing surfaces engaged by the balls.

The use of the plates 27 and 30 tends to greatly increase the useful life of the casters, since in addition to the increased original life of the casters the plates 27 and 30 are readily renewable if worn or fractured, and even where fractured and renewal is neglected, the fragments of the fractured plate 27 or 30 drop out and a new unfinished face of the plate 15 or frame 19 becomes a bearing surface for the balls 29 until repairs are made.

In order to support the caster wheel axle 22 in substantially non-rotatable relation to the arms 20 and 21 of the caster frame so that the caster wheel will rotate upon the axle 22 in place of the axle 22 rotating relative to the frame 19, I provide one or more ribs or projections 40 on the outside of the arms 20 and 21 having a face 41 to engage a face 42 on the head 43 of the caster wheel axle to prevent said axle from turning relative to the frame 19. After the axle 22 and wheel 24 have been assembled, the end 44 of the axle opposite its head may be headed or riveted over as shown in Fig. 2, to prevent detachment of the axle 22, or the end 44 of the axle may be provided with a perforation 45 to receive a cotter pin to detachably retain the axle 22 in place relative to the frame 19.

The ball spacer 28 comprises a main disk or annular plate having a series of tapered perforations 46 each with a rim 47 raised from the plate 28 at the wider end of the perforations 46. The perforations 46 are of sufficient diameter to receive the balls 29 at their wider ends but not to pass the balls through their narrower ends. The ball spacers 28 are designed to be used as unfinished castings, and when held with the rims 47 upward, said ball spacers are adapted to be inserted beneath the surface of a quantity of balls in a container so as to emerge with each of the perforations 46 charged with a ball, while the surplus balls roll off the spacer back into the container, thereby effecting a considerable saving in time over a form of spacer requiring a finishing operation or to have each ball inserted therein one at a time. When assembled the balls 29 are retained in operative relation even though a portion of the plate 15 should become broken and detached.

My improved caster is low in labor and material cost, and adapted to efficiently serve its purpose for long periods of time without attention. It is readily restored to useful condition when required.

The apparatus herein shown and described is capable of considerable modification without departing from the spirit of my invention.

What I claim is:

A caster comprising a caster plate, having a downwardly directed tubular projection, a caster frame provided with a caster wheel, a king-bolt member passing through said tubular projection and interposed between the caster plate and caster frame, a separable annular ball spacer interposed between said caster plate and caster frame and held concentrically in position by the downwardly directed tubular projection of said caster plate, said ball spacer being provided with a plurality of conical ball recesses of less diameter at their narrow ends than the diameter of the spacer balls and with raised rims at the wider ends of said ball recesses, end thrust balls located in said spacer ball recesses, a ball radial thrust bearing encircling said king bolt member at its lower end and radial thrust balls located in said radial thrust bearing to take both the end thrust and radial thrust of said caster frame upon said caster plate.

In testimony whereof I have affixed my signature.

EDWARD T. MALLOY.